United States Patent [19]

Ichiyanagi et al.

[11] 4,079,398

[45] Mar. 14, 1978

[54] SELF-TIMER

[75] Inventors: Toshikazu Ichiyanagi, Tokyo; Hideto Iwama, Kawasaki; Noritsugu Hirata, Yokohama; Kazuo Ishikawa; Hidekazu Okajima, both of Kawasaki; Masamichi Toyama, Machida; Mamoru Shimazaki, Tokyo; Tomoshi Takigawa, Machida, all of Japan

[73] Assignee: Canon Kabushiki Kaisha, Tokyo, Japan

[21] Appl. No.: 595,008

[22] Filed: Jul. 11, 1975

[30] Foreign Application Priority Data

Jul. 15, 1974 Japan .................... 49-80842

[51] Int. Cl.² ............... G03B 15/00; G03B 1/00; G03B 9/64
[52] U.S. Cl. .................... 354/212; 352/175; 354/238
[58] Field of Search ........... 354/212, 246, 237, 129, 354/238, 213; 352/174-177

[56] References Cited

U.S. PATENT DOCUMENTS

| 2,667,808 | 2/1954 | Hart | 352/177 X |
|---|---|---|---|
| 3,280,713 | 10/1966 | Goldberg | 354/213 X |
| 3,602,584 | 8/1971 | Anderl et al. | 352/174 |
| 3,640,201 | 2/1972 | Kimura | 354/238 X |
| 3,641,902 | 2/1972 | Kikuchi et al. | 354/238 X |
| 3,667,367 | 6/1972 | Miyagawa | 354/238 |
| 3,683,774 | 8/1972 | Lange | 354/238 X |
| 3,692,393 | 9/1972 | Anderl | 352/175 |
| 3,715,959 | 2/1973 | Harvey | 354/246 X |

FOREIGN PATENT DOCUMENTS

| 1,810,377 | 10/1969 | Germany | 354/129 |
|---|---|---|---|
| 1,252,525 | 10/1967 | Germany | 354/238 |
| 2,165,141 | 7/1972 | Germany | 354/237 |
| 1,213,320 | 11/1970 | United Kingdom | 354/238 |

OTHER PUBLICATIONS

Leica Photography Magazine 354-212, vol. 19, No. 1, 1966 cover (back page).
Leica Photography Magazine 354-212, vol. 18, No. 3, 1965, pp. 10-11, New Motor Drive for Leica M2.

Primary Examiner—Donald Griffin
Attorney, Agent, or Firm—Toren, McGeady and Stanger

[57] ABSTRACT

A self-timer for cinecameras wherein an electric delay circuit is used for detecting a length of time from the release to the commencement of a photographing process which takes place with an electric power having been actually supplied to a film feeding motor. The amount of the rotation made by the film feeding motor from the start of the rotation of the motor is either mechanically or electrically detected. When the detected amount of rotation reaches a preset value corresponding to a number of frames of the film required for self-timer photographing, the motor is stopped to terminate the photographing operation, so that the photographing operation with the self-timer can be accomplished exactly for a preset number of frames.

17 Claims, 8 Drawing Figures

SELF-TIMER

BACKGROUND OF THE INVENTION

1. Field of the Invention

This invention relates to a self-timer which is usuable for cinecameras.

2. Description of the Prior Art

For the conventional self-timers for cinecameras, there has been known a method wherein a plurality of delay circuits which have different lengths of delaying time are employed in determining the operating time of a film feeding motor. With these delay circuits, a length of time from the release to the commencement of a photographing process and another length of time from the commencement of photographing to the end of the photographing process are controlled according to the different lengths of their delaying time. However, the delay circuits employed in the conventional method being composed of resistances, capacitors, etc., they are vulnerable to the effect of a leakage current or temperature. Besides, since the photographing time, etc., are controlled solely by the length of time determined by each of these delay circuit, such control of the photographing time is not based on any detected information that corresponds to the amount of motor rotation or the number of frames actually forwarded. Therefore, when there has been a variation in the voltage of the power supply to the self-timer or in the ambient temperature and when such variation has resulted in a change of the delaying time of the delay circuits, the photographing operation is not accomplished for the preset number of frames. This representss a great disadvantage of the conventional method.

SUMMARY OF THE PRESENT INVENTION

An object of this invention is to provide a self-timer for cinecameras which detects the number of motor rotations and which automatically stops the motor rotation when the motor has made a preset number of rotations in a photographing operation performed with the self-timer.

Another object of this invention is to provide a self-timer for cinecameras which performs a self-timer photographing operation by detecting the amount of motor rotation by means of a mechanical detection mechanism and by automatically stopping the rotation of the motor when it has rotated by a preset amount.

A further object of this invention is to provide a self-timer for cinecameras which performs a self-timer photographing operation by detecting the amount of motor rotation by means of an electrical detection mechanism and by automatically stopping the motor rotation when it has reached a preset amount.

The above and other objects, features and advantages of the present invention will become more apparent from the following description of some embodiments thereof taken in conjunction with the accompanying drawings.

BRIEF DESCRIPTION OF THE DRAWING

In the accompanying drawings.

DESCRIPTION OF THE PREFERRED EMBODIMENTS

Figure 1:
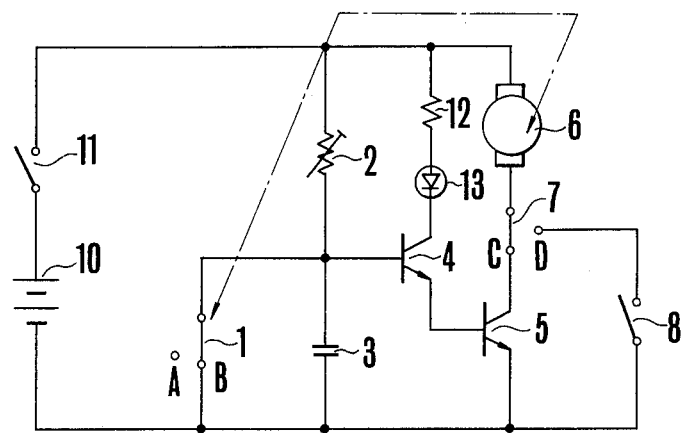
FIG. 1 is a circuit diagram illustrating an embodiment of the invented self-timer.

In FIG. 1 which illustrates an embodiment of this invention, a switch 1 is interlinked to a film feeding motor 6 in such a way as to effect switching from a contact A to another contact B when the motor 6 has made a preset number of turns. A delay circuit is composed of a variable resistance 2 and a capacitor 3. A switching circuit is composed of transistors 4 and 5. A self-timer selector switch 7 is connected to a contact D for an ordinary photographing operation. A reference numeral 8 indicates a release switch; 10 a power source; 11 a main switch; 12 a resistance; 13 a light emitting diode, which is connected to the collector of the transistor 4 and is arranged to be alight at the time of a self-timer photographing operation.

Figure 3A:
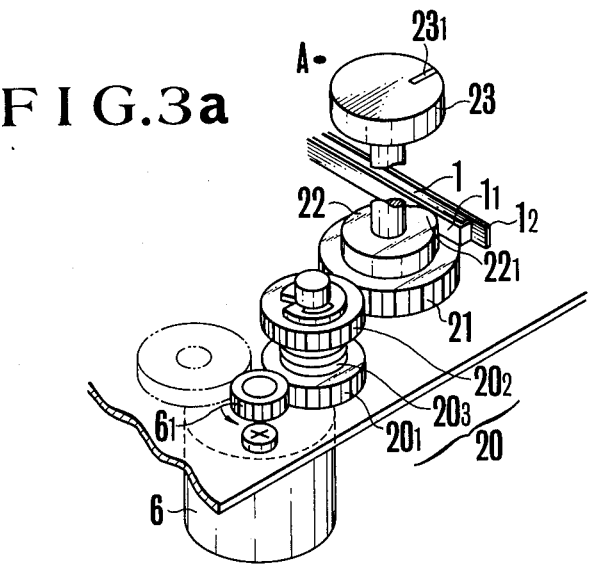
FIG. 3a and 3b show perspective views illustrating the switching mechanism of the embodiment represented by FIG. 1.
Figure 3B:
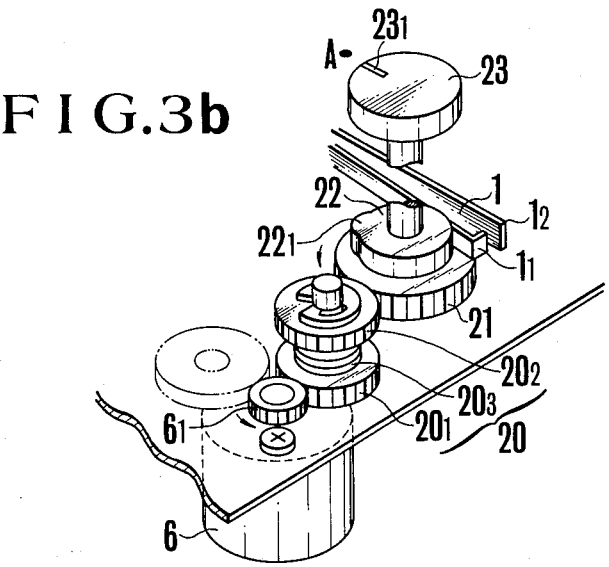

FIGS. 3a and 3b illustrate the switching mechanism employed in the embodiment represented by FIG. 1. In these drawings, a friction gear 20 comprises a gear $20_1$, which engages with the rotating shaft $6_1$ of the motor 6, a gear $20_2$, which is coaxial with the gear $20_1$, and a spring $20_3$. The rotation of the gears $20_1$ and $20_2$, which takes place according as the motor 6 rotates, is transmitted to a gear 21 which is interlinked with the gear $20_2$. A rotary member 22 is securely disposed on the gear 21. The rotary member 22 is provided with a protrusion $22_1$ on its periphery. FIG. 3a shows the protrusion $22_1$ as in a position where it is in pressed contact with a moving contact piece $1_1$ of the switch 1 to close the switch. A self-timer time setting dial 23 which is disposed outside an unillustrated camera body and which is provided with an indication mark $23_1$ on the upper face of it. A point A is marked on the unillustrated camera body. By adjusting the position of the indication mark $23_1$ to the mark A the switch 1 is opened to make the camera ready for photographing as illustrated in FIG. 3b. When the dial 23 is rotated for adjustment to the mark A, the gear $20_2$ is turned through the gear 21 in the direction opposite to the rotating direction of the dial 3. However, since the gear assembly 20 is a friction gear, the gear $20_1$ does not rotate then and the motor also does not rotate. The embodiment of this invention illustrated in FIG. 1 and FIG. 3 operates as described below:

For self-timer photographing, the dial 23 which is shown in FIG. 3 is rotated counterclockwise until the indication mark $23_1$ marked on the dial reaches the mark A. This dial operation causes the rotary member 22 to rotate counterclockwise. Then the protrusion $22_1$ of the rotary member 22 relieves the pressure on the moving contact piece $1_1$. By this, the switch 1 is opened as illustrated in FIG. 3b. The above stated rotation moves the protrusion $22_1$ away from the contact piece of the switch 1, so that the switch is turned off and is connected to the contact A shown in FIG. 1. Then, with the selector switch 7 connected to the contact C by means of a switch disposed in the unillustrated camera body, the main switch 11 can be turned on by depressing an unillustrated power source button which is disposed outside the cinecamera. When the main switch is thus turned on, an electric current from the power source 10 flows through the resistance 2 to the capacitor 3 to charge the capacitor 3. Then the capacitor 3 is charged to a preset level after a period of time determined by the variable resistor 2 and the capacitor 3, the transistors 4 and 5 are turned on. This causes an electric current flow through the transistor 5 to a film feeding motor, which then begins to operate for photographing. The operating condition of the motor can be confirmed by means of the light emitting diode 13. In this manner, the photographing process begins subsequent to a delay time which is determined by the capacitor 3 and the variable resistance 2 after the main switch 11 is turned on. When the motor rotates in the direction of the arrow in FIGS. 3a an 3b, the above stated rotary plate 22 also rotates in the direction of arrow through the friction gear 20 and gear 21. With the motor having rotated a preset amount, the above state protrusion $22_1$ again turns on the switch 1. This causes the electric charge of the capacitor 3 to be discharged through the switch 1. The transistors 4 and 5 are turned off. The light emitting diode 13 is put out to indicate the completion of the photographing process. Concurrently with this, the motor 6 stops to end the photographing operation. In ordinary photographing, the switch 7 is connected to the contact D and the switches 8 and 11 are turned on for a continuous photographing. On the other hand, for self-timer photographing, the length of such photographing time can be adjusted as desired by turning the dial 23 to a desired position. By this, the amount of motor rotation required during a period of time between the commencement of the photographing operation and having the switch 1 turned on is adjusted through the protrusion $22_1$. Therefore, the length of time for self-timer photographing is adjustable.

Figure 2:
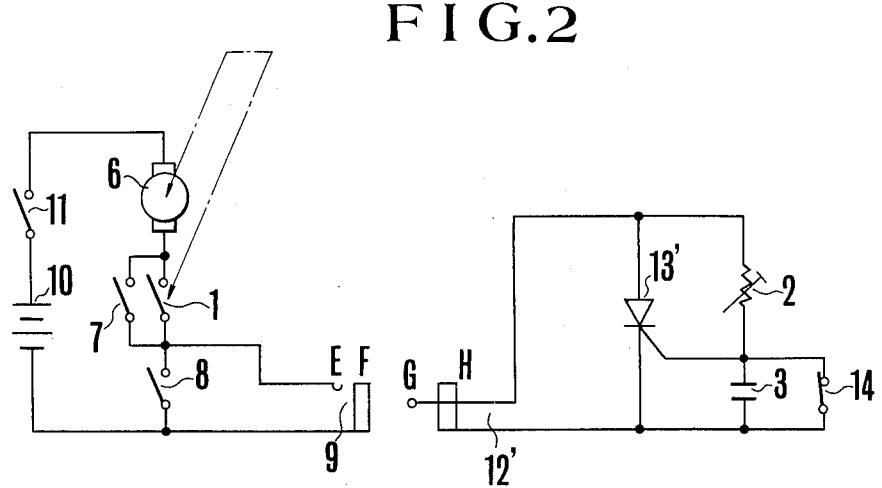
FIG. 2 is another circuit diagram illustrating another embodiment of the invented self-timer.

FIG. 2 illustrates another embodiment of the self-timer of this invention. This embodiment is identical in principle with the other embodiment illustrated in FIG. 1 in terms of arrangement and performance. Therefore, in these drawings, like reference numerals indicate like components of each circuit. However, FIG. 2 differs from FIG. 1 in the provision of a remote jack 9 with contacts E and F, a plug 12' with contacts G and H, a SCR 13' for switching and a start switch 14, which are not used in the embodiment of FIG. 1 but are provided in the embodiment of FIG. 2 for the purpose of enabling to control the cinecamera from outside.

Figure 4A:
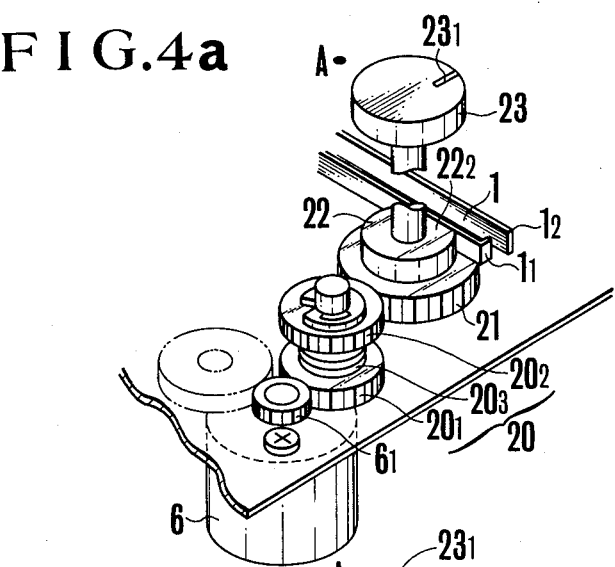
FIGS. 4a and 4b show perspective views illustrating the switching mechanism of the embodiment represented by FIG. 2.
Figure 4B:
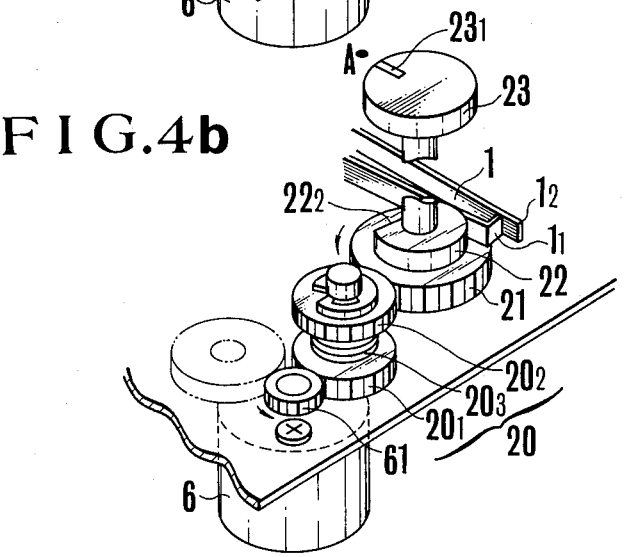

FIG. 4 illustrates the relation of the motor 6 to the interlinked switch 1 in the embodiment of FIG. 2. Since the arrangement and performance of this embodiment are identical in principle with those of FIG. 3, like reference numerals are used in the two drawings for indicating like parts. However, FIG. 4 differs from FIG. 3 in that the embodiment represented by the former is provided with a flat portion $22_2$ in the circumference of the rotary plate 22. The embodiment represented by the FIG. 2 and FIG. 4 operates as described below:

The plug 12' is connected to the remote jack 9. This connects the contacts E and F to the contacts G and H respectively to complete preparation for photographing. Following this, the dial 23 is operated in the same manner as in the other embodiment represented by FIG. 1 and FIG. 3. By this, the rotary plate 22 is rotated causing the flat portion $22_2$ to move away from the contact piece of the switch 1. The circumferential portion of the rotary plate then comes into pressed contact with the contact piece. This turns on the switch 1. Then, with the self-timer selecting switch 7 and the release switch 8 in their off conditions, the external power source button is depressed to turn the main switch 1 on. With the main switch 1 turned on, a current from the power source 10 flows through the film feeding motor 6, switch 1, remote jack 9, plug 12', variable resistance 2 and start switch 14. However, the motor 6 still does not rotate and remains stationary as the current is too weak for actuating it. Next, an unillustrated self-timer switch which is disposed outside the cinecamera is operated to turn the start switch 14 off. With the start switch 14 turned off, the above stated current begins to charge the capacitor 3 until the latter is charged up to a preset level after a period of time determined by the variable resistance 2 and the capacitor 3. When the electric charge of the capacitor 3 reaches the preset level, SCR 13' is turned on to cause a flow of a great current, which causes the motor 6 to rotate and thus to start the photographing process. When the motor has rotated as much as a preset amount of rotation, the flat portion $22_2$ of the rotary plate 22 which has been rotating with the motor 6 again comes into contact with the contact piece of the switch 1 to turn off the switch. With the switch 1 thus having been turned off, the motor 6 comes to a stop to end the photographing operation.

Figure 5:
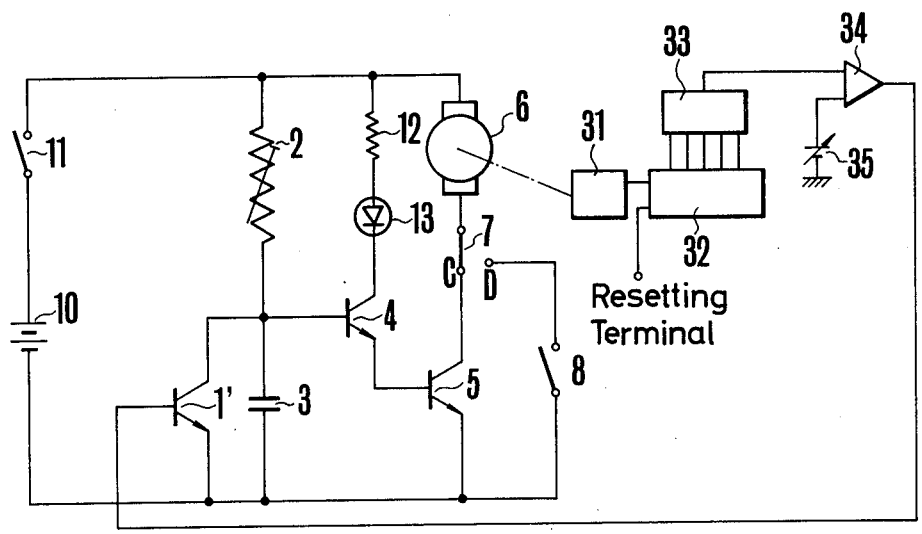
FIG. 5 is a circuit diagram illustrating another embodiment of this invention.
Figure 6:
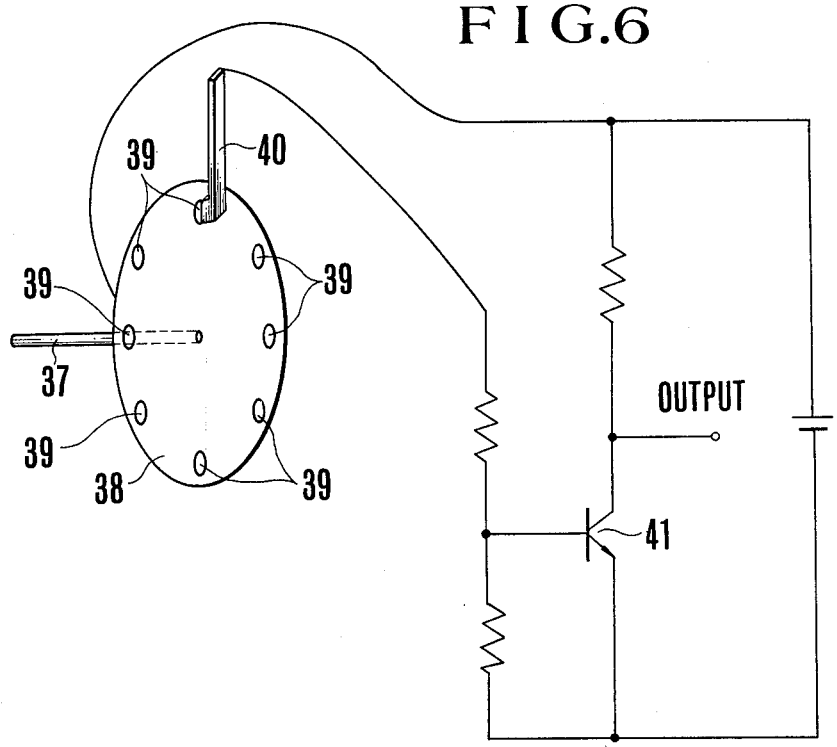
FIG. 6 is a circuit diagram illustrating the circuit arrangement of a pulse generator of the embodiment represented by FIG. 5.

FIG. 5 and FIG. 6 are circuit diagrams illustrating another embodiment of this invention. The circuit elements of the same arrangement and the same performance as those of the embodiment shown in FIG. 1 are indicated with the same reference numerals as FIG. 1. However, in this embodiment, there is provided a pulse generator 31 which generates a pulse signal which corresponds to the amount of rotation of the motor. A counter 32 counts the number of pulses generated by the pulse generator 31. A voltage which corresponds to the counter number of pulses is obtained by a digital-to-analog converter 33. A comparator 34 compares the voltage with a preset voltage 35. The transistor 1' is turned on when the two voltages coincide with each other. FIG. 6 illustrates an example of the pulse signal generator of FIG. 5. In FIG. 6, a rotating shaft 37 rotates with the rotating shaft of the motor 6. A rotating plate 38 is secured to the rotating shaft 37. Conductors 39 are arranged on the rotating plate 38. A contact piece 40 which is made of a conductive material and which turns on a transistor 41 every time it comes into contact with the conductors 39 in such a way as to generate, at the output end of the transistor 41, a signal comprising a number of pulses that corresponds to the amount of the motor rotation. The embodiment illustrated in FIG. 5 and FIG. 6 operates as described below:

With the switch 7 connected to the contact C, when the unillustrated power source button is depressed, the switch 11 is turned on to make an electric current flow to the capacitor 3 through the resistance 2. The capacitor is charged by this. After a length of time corresponding to a time constant determined by the capacitor 3 and the resistance 2, the transistors 4 and 5 are turned on causing the motor to start running and the photographing process begins. Following the rotation of the motor 6, the rotating plate 38 rotates causing the conductor 39 to intermittently come into contact with the contact piece 40. This results in the repeated on-and-off actuation of the transistor 41 to produce at the output end of the transistor a signal comprising a number of pulses corresponding to the amount of the motor rotation. Then, the counter 32 counts the number of pulses. The counted number of pulses is converted by the digital-to-analog converter 33 into a voltage which corresponds to the number of pulses, i.e., to the amount of the motor rotation. The comparator 34 compares this voltage with the voltage 35 which corresponds to a preset amount of motor rotation, i.e., to the number of frames to be photographed. When the two voltages come to coincide with each other, the comparator 34 generates an output, which is transmitted to the transistor 1' to turn on the transistor. This in turn makes the transistors 4 and 5 off to stop the power supply to the motor 6 to end the photographing operation. The self-timer photographing time is adjustable by changing the value of the voltage 35. In this embodiment, the number of pulses counted by the counter 32 is converted into a voltage. However, this mode of conversion may be replaced with a digital control arrangement with the output of the counter 32 directly connected to the base of the transistor 1'.

As described in the foregoing, in the self-timer of this invention, the amount of rotation of a film feeding motor is utilized. The electric power supply to the motor is stopped when the motor rotation has reached a preset amount of rotation. The invented method thus requiring the use of only one delaying means, it not only simplifies the circuit arrangement but also permits an accurate self-timer photographing operation. It is therefore highly advantageous for application to a self-timer of a cinecamera.

What is claimed is:
1. A self-timer for cinecameras comprising;
   a. a delay circuit which delays the time to start photographing,
   b. a film feeding motor,
   c. switching means which forms a power supply path leading to said film feeding motor in response to the output of said delay circuit, the switching means being connected to said motor,
   d. converting means coupled to said film feeding motor for converting the amount of rotation of said motor into a quantity of electricity having a given relation to the motor rotation, and
   f. a control circuit coupled to said converting means for generating a signal to make said switching means inoperative when the quantity of electricity of said converting means becomes a preset value.
2. A self-timer for cinecameras according to claim 1, in which said converting means being provided with a pulse generator which converts the amount of said motor rotation into a number of pulses having a given relation to the motor rotation.
3. A self-timer for cinecameras according to claim 1, in which said control circuit having;
   a. a reference signal generator which produces a reference quantity of electricity,
   b. a comparator which is coupled to said converting means and to said reference signal generator to compare the output of the one with that of the other and which generate an output when these outputs of the two come to satisfy a preset relation, and
   c. second switching means which is coupled to said comparator to operate in response to the output of said comparator, the second switching means being also coupled to said switching means to make said switching means inoperative by the switching action of the second switching means.
4. A self-timer for cinecameras according to claim 3, which further comprises adjusting means for making adjustable the reference quantity of electricity produced by said reference signal generator.
5. A self-timer for cinecameras according to claim 1, in which said control circuit includes a second switching means which is coupled to said delay circuit to make a switching action when the quantity of electricity of said converting means becomes a preset value and which thus resets the output of said delay circuit.
6. A self-timer according to claim 1, which further comprises means for indicating the operating condition of said motor during self-timer operation.
7. A self-timer according to claim 6, wherein said indicating means is connected to said switching means.
8. A self-timer according to claim 1, wherein said switching means includes an operating switch responsive to said delay means and a selecting means for selectively bypassing the operating switch so as to provide for selection of continuous photographic operation or self-timer operation.
9. A self-timer for cinecameras comprising:
   a. a delay circuit which delays the time to start photographing for a preset length of time;
   b. a film feeding motor whose number of rotations corresponds to a number of film frames photographed;
   c. first switching means connected to said film feeding motor and coupled to the delay circuit for forming a power supply path to the motor and operating in response to the output of said delay circuit;
   d. a setting means for setting information on the number of film frames to be photographed;
   e. a displacement member coupled to said setting means and assuming an initial position corresponding to the number of film frames set by said setting means and coupled to said motor so as to be mechanically displaced from said initial position in response to the rotation of the film feeding motor to an extent corresponding to the amount of rotation of the motor, and
   f. a second switching means coupled to the displacement member and coupled to said delay circuit for resetting the output of the delay circuit and interrupting the power supply path when the displacement of the displacement member corresponds to the number of film frames to be set.
10. A self-timer for cinecameras comprising:
   a. a delay circuit which delays the time to start photographing for a preset length of time;
   b. a film feeding motor whose number of rotations corresponds to a number of film frames photographed;
   c. first switching means connected to said film feeding motor and coupled to the delay circuit for forming a power supply path to the motor and operating in response to the output of said delay circuit;
   d. a setting means for setting information on the number of film frames to be photographed;
   e. a displacement member coupled to said setting means and assuming an initial position corresponding to the number of film frames set by said setting means and coupled to said motor so as to be mechanically displaced from said initial position in response to the rotation of the film feeding motor to an extent corresponding to the amount of rotation of the motor, f. a second switching means coupled to the motor and the displacement member and connected to said power-supply-path forming switching means so as to interrupt the power supply path when said displacement member is displaced from said initial position to a preset position;

g. said second switching means being coupled to said delay circuit for resetting the delay circuit when the switching means operates to interrupt the power supply path.

11. A self-timer for cinecameras according to claim 10 which further comprises a means coupled to one of said first switching means for indicating the operation condition to said motor during the self-timer operation.

12. A self-timer for cinecameras according to claim 11, wherein said indicating means is connected to said first switching means in the power supply path.

13. A self-timer for cinecameras according to claim 10, wherein said motor and said switching means are disposed in the camera body; said delay circuit forms a unit which is mountable and detachable on and from the camera body; and, with said unit coupled to the camera body, power is supplied to said motor after a length of time determined by said delay circuit.

14. In a cinecamera for photographically exposing a preset number of film frames a preset length of time after shutter release, a self-timer, comprising:

a. a delay circuit which produces an output after a predetermined time from shutter release;

b. a film feed controlling motor which rotates to continuously feed film and thus to permit sequential exposure to a number of film frames corresponding to the amount of rotation of the motor;

c. an electrical switching means coupled to said delay circuit for forming an electric power supply path to said motor in response to the output of said delay circuit; and d. a control means coupled to said motor to detect the amount that the motor rotates and to reset the delay circuit for interrupting the power supply path to the motor formed by said switching means after sequential exposure of a preset number of film frames.

15. A self-timer for cinecameras comprising:

a. a delay circuit which delays the time to start photographing for a preset length of time;

b. a film feed motor whose number of rotations corresponds to a number of film frames photographed;

c. a switching means connected to said film feed motor and coupled to said delay circuit for forming a power supply path to the motor and operating in response to the output of said delay circuit so that the motor starts after the delay of said delay circuit;

d. a setting means for setting information on the number of film frames to be photographed;

e. a control means coupled to said motor and to said setting means for interrupting the power supply path when the rotation of the motor reaches the number of film frames set by the setting means so as to stop the motor after the number of film frames set by the settling means have been photographed; and f. said control means includes switching means for resetting said delay circuit when the rotation of the motor reaches the number of film frames set by the setting means.

16. A self-timer for cinecamera according to claim 15, which further comprises a selecting means disposed between said motor and said switching means for alternately connecting the motor to said switching means and forming a conductive path directly to said motor so as alternately to select self-timing or continuous operation.

17. A self-timer for cinecameras according to claim 15, in which said switching means is so made that it is functionally coupled with said motor and resets said delay circuit when said motor makes such number of rotations as corresponding to the number of film frames being set by said setting means.

* * * * *